Figure 1:
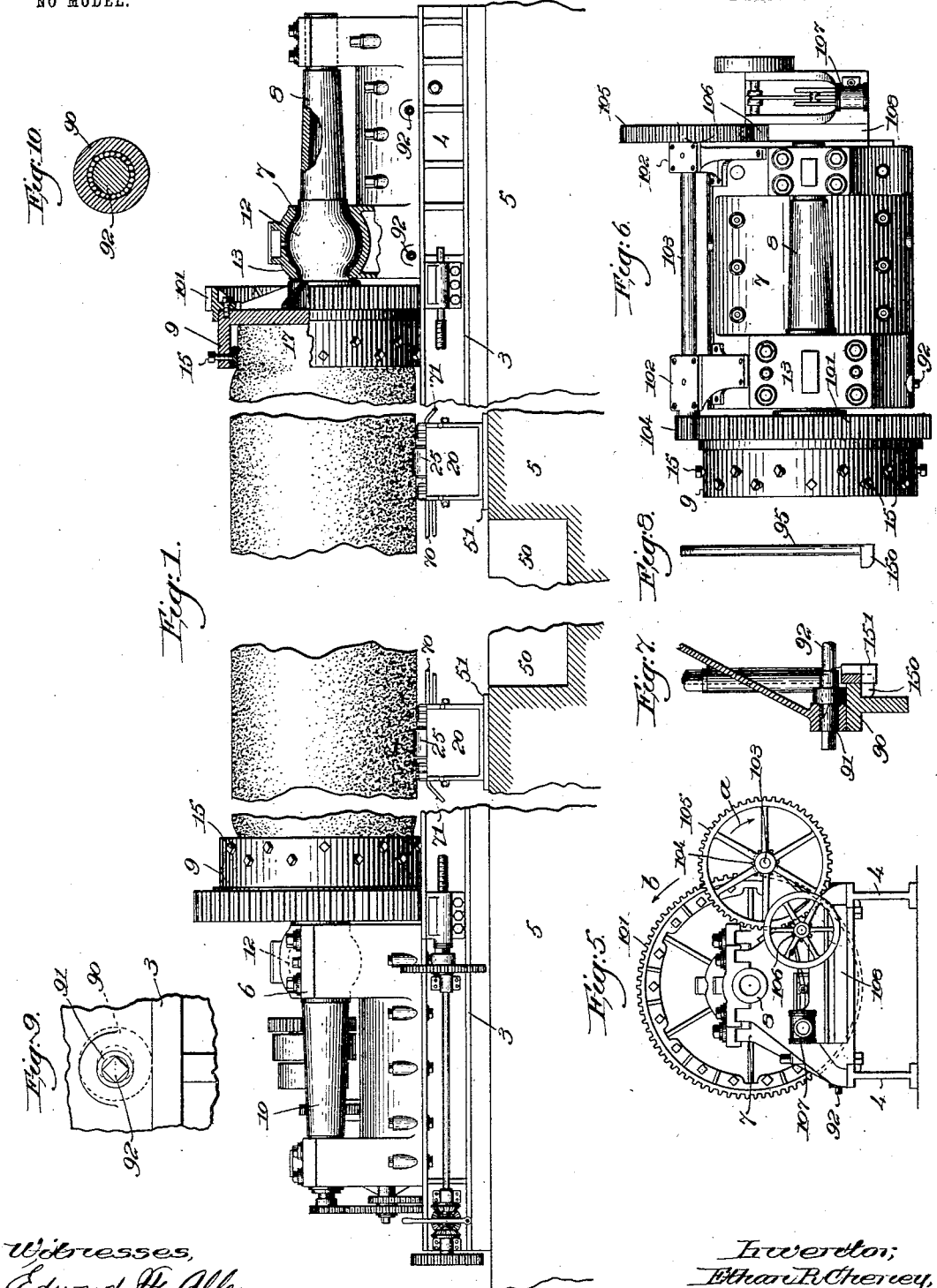

No. 746,024. PATENTED DEC. 8, 1903.
E. R. CHENEY.
LATHE FOR DRESSING STONE.
APPLICATION FILED APR. 2, 1901.
NO MODEL. 2 SHEETS—SHEET 2.

Witnesses
Edward H. Allen.
Fred S. Greenhof.

Inventor,
Ethan R. Cheney,
by Crosby Gregory,
attys

No. 746,024. Patented December 8, 1903.

UNITED STATES PATENT OFFICE.

ETHAN R. CHENEY, OF CHELSEA, MASSACHUSETTS.

LATHE FOR DRESSING STONE.

SPECIFICATION forming part of Letters Patent No. 746,024, dated December 8, 1903.

Application filed April 2, 1901. Serial No. 54,049. (No model.)

*To all whom it may concern:*

Be it known that I, ETHAN R. CHENEY, a citizen of the United States, residing at Chelsea, in the county of Suffolk and State of Massachusetts, have invented an Improvement in Lathes for Dressing Stone, of which the following description, in connection with the accompanying drawings, is a specification, like numerals on the drawings representing like parts.

Heretofore in the turning of stone columns it has been common to employ a lathe having centers which engage suitable recesses in the ends of the stone column, the said stone column being supported entirely by the centers and being connected to the live-spindle of the lathe to turn therewith by some suitable mechanism. A suitable tool-carriage carrying a tool is traversed back and forth on the lathe-bed by means of the usual lead-screws. A stone-dressing lathe of this type is illustrated in Patent No. 265,581, granted to me October 16, 1882. While such a type of lathe is suitable for turning comparatively small and short columns of stone, it has been found that where large columns of stone, varying from three to seven feet in diameter and from thirty to seventy feet in length, are being turned the centering devices such as illustrated in the above-named patent are insufficient to support the enormous weight of a large column of stone, and in my improved lathe, which forms the subject-matter of this application, I have devised a novel form of centering device which is used on both the head and tail stocks of the lathe, the said centering device comprising a socket-piece of such a size as to receive the end of the column of stone and a series of suitable adjustable bearing-blocks supported in the sides of the socket-pieces and bearing against the periphery of the stone column at the end thereof. By adjusting the bearing-blocks the stone can be properly centered, and the socket-pieces furnish supporting means of sufficient strength to hold even extremely large pillars or columns of stone. It has also been found that where long stone columns are being turned—*i. e.*, columns varying from fifty to seventy-five feet in length—the great weight of the column is liable to cause the same to break intermediate its ends, and to avoid this difficulty I have provided my lathe with suitable work-rests, which are normally situated between the ways of the bed of the lathe and in such position that they will not interfere with the movement of the tool-carriage nor with the operation of placing a stone column in the lathe or removing it therefrom. Preferably I will employ two work-rests, which are situated approximately centrally between the head and tail stocks of the lathe, and a suitable pit will be dug in the foundations for the lathe-bed, said pit being of such a size as to admit of the two rests being dropped into the same when the stone pillar is to be placed into or removed from the lathe, whereby the said rests may not interfere with such operation. After the stone has been properly supported in the lathe the rests will be lifted from the pit and placed underneath the stone column adjacent the said pit. Each rest comprises a suitable housing in which is mounted a vertically-adjustable roller-frame carrying a plurality of rolls. When the rest has been lifted from the pit and placed in operative position, the roller-frame will be adjusted vertically in the housing until the rolls contact with the under side of the stone column and partially support the same. I also preferably attach to the tail-stock a supplemental motor or engine, which may be of such a size as to furnish about half power enough to operate the lathe, whereby both the head and tail stocks are driven, thus doing away with the great torsion to which the stone column would be subjected if the lathe were driven entirely from the head-stock, as is the case in ordinary stone-turning lathes.

Figure 2:
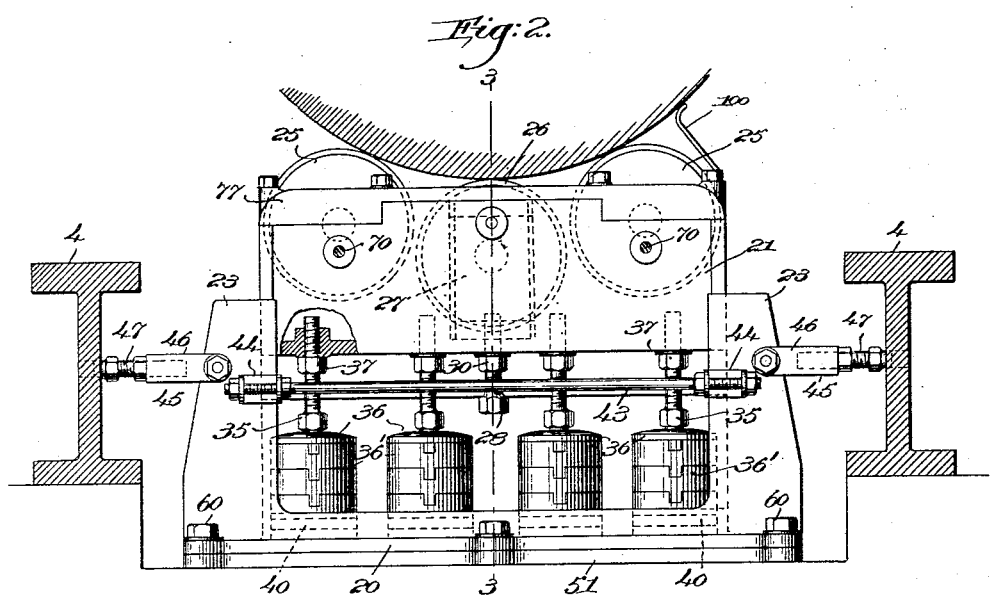
Figure 3:
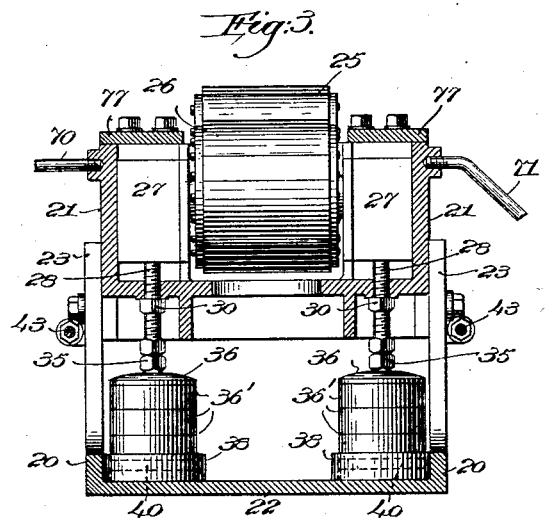
Figure 4:
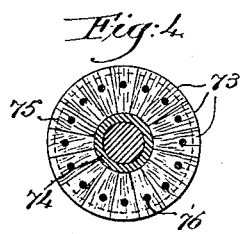

Referring to the drawings, Figure 1 illustrates an elevation of my improved lathe with portions thereof broken out and with the tool-carriage omitted for the sake of clearness. Fig. 2 is an elevation of one of the work-rests in operative position, a portion of the ways of the bed of the lathe being shown in section. Fig. 3 is a section on the line 3, Fig. 2. Fig. 4 shows a section of one of the rolls employed in the roller-frame where the stone is being polished. Figs. 5 and 6 are reduced views showing the tail-stock with the supplemental engine attached thereto. Fig. 7 is a detail showing the antifriction-rolls for the tail-stock. Fig. 8 shows one of the hooked bolts used for holding the head and tail stocks in place, and Figs. 9 and 10 are further details of the antifriction-rolls for the tail-stock.

The bed 3 of the lathe may be of any suitable construction, it having the parallel ways 4 on which the tool-carriages (not shown) are mounted to slide, there preferably being a plurality of such tool-carriages, one or more on each side of the lathe, as in my patent above referred to, the said bed 3 being supported upon a suitable stone or concrete foundation 5. At one end of the bed is rigidly mounted in any suitable way the head-stock 6, and at the other end of the bed is slidably mounted the tail-stock 7, the tail-stock 7 having the spindle 8, provided with a centering device, and the head-stock having the live-spindle 10, which is driven by any suitable driving mechanism and carrying a similar centering device. Each spindle 8 and 10 is provided with the approximately spherical portion 12, which is mounted in a suitable bearing 13, the said spherical portion 12 and its bearing being in the nature of a ball-and-socket joint, the purpose of which is to provide means for taking the end thrust of the spindles 8 and 10 without the necessity of making said spindles with a usual shoulder.

The centering devices carried by the head and tail stocks are identical in construction, and each comprises the cup-shaped socket-piece 9, integral with its spindle, the said socket-piece being of a sufficient size to have inserted thereinto the end of the stone column to be turned.

In order to center the stone column and to clamp the same securely in the cup-shaped socket-piece 9, the side walls of the said socket-pieces are provided with the series of adjusting-screws 15, which bear at their inner ends against bearing-blocks, the said blocks engaging the periphery of the end of the stone column, as plainly seen in Fig. 1, and having their faces curved to fit the stone.

Before the stone column is placed into the lathe the ends thereof will be cut to approximately the correct size, as seen at 17, Fig. 1, and after the stone has been placed in the lathe and supported in the centering devices the latter will be properly adjusted to center the stone, as will be readily understood.

In the turning of stone columns of great length it is necessary to support the stone by means of suitable work-rests intermediate the centering devices in order to prevent the stone from being broken by its own weight, and it is also necessary that said work-rests shall be out of the way of the tool-carriages and shall also be so constructed that they will not hinder the operation of placing the stone into the lathe or removing it therefrom. The work-rest I have devised to accomplish these objects is illustrated in Figs. 2 and 3, and it comprises the housing or base portion 20, in which is vertically adjustable the roller-frame 21, the said roller-frame carrying a plurality of rolls which when the roller-frame is adjusted may be brought to contact with the under surface of the stone column. The housing 20 is of such a size as to be received between the ways 4 of the bed of the lathe, and I preferably make the same with the base 22, at the ends of which are the upturned arms 23, between which arms the roller-frame 21 is vertically slidable. (See Fig. 2.) The roller-frame carries a series of rolls, preferably three in number, the two outside rolls 25 being journaled in any suitable way in fixed bearings in said roller-frame, while the central roll 26 has its shaft journaled in the movable boxes 27, guided in suitable ways in the roller-frame and capable of being adjusted vertically by means of the adjusting-screws 28, which bear at their ends against the boxes and operate through the floor of the roller-frame, (see Fig. 3,) suitable check-nuts 30 being employed to lock the screws in their adjusted positions. The object in making the central roll 26 adjustable is so that the three rolls of the series may be brought to bear with an even pressure upon the periphery of a stone column of any diameter. The roller-frame 21 is vertically adjusted in the housing 20 by means of adjusting-screws 35, which operate in the floor of the roller-frame 21 (see left-hand end of Fig. 2) and bear at their lower ends against suitable rests 36, the usual check-nuts 37 being provided to hold the said adjusting-screws in their adjusted position. Preferably I will employ a series of such adjusting-screws 35 on each side of the roller-frame, there being four adjusting-screws shown in each series in this embodiment of my invention, although, of course, it will be understood that the number of screws may be varied according to the circumstances of the case.

The base or floor 22 of the housing 20 is provided with two series of pockets 38, which contain suitable cushions upon which the rests 36 are supported, the cushions being illustrated in the drawings as disks 40, of rubber, though it will be understood that metallic springs or cushions may be used, if desired. The object of the cushions is to provide a slightly-yielding support for the roller-frame, so as to avoid the danger of breaking the work-rest should a chip or other foreign matter pass between the rolls and the stone column.

To prevent as far as possible any chips from getting caught between the rollers and the stone column, I preferably employ elastic clearers 100, which may be bolted to the roller-frame, as shown in Fig. 2, and which are curved at their upper ends and rest flat against the surface of the stone column.

The rests 36 for the ends of the adjusting-screws 35 are sectional rests, they comprising a series of sections 36', which may be placed one above the other for the purpose of bringing the upper surface of the rest to any required height, and preferably the sections 36' will have suitable interlocking faces, as seen in Fig. 2. The upper member of the sectional rest 36 is preferably provided with a central recess in which the end of the adjusting-screw 35 may be seated.

In order to strengthen the housing and prevent the same from giving or yielding under the stress due to the great weight of the stone-support thereon, I preferably connect the arms 23 by means of the tie-rods 43, said tie-rods engaging at their ends suitable ears or lugs 44. Preferably each arm 23 will also have pivoted thereto an extensible compression-brace 45, the said brace comprising the member 46, pivoted to the arm 23, in the end of which is mounted the screw 47, the end of the screw when in its adjusted position bearing against the webs of the ways 4 of the bed of the lathe, as seen in Fig. 2.

The foundation 5 for the bed 3 of the lathe is preferably provided with a suitable pit 50, situated approximately centrally between the head and tail stocks of the lathe, the said pit preferably being of such a size as to receive two of the work-rests above described, and either side of the pit on the foundation will be secured, by means of bolts or in any usual way, the bed-plates 51 for the work-rests.

Whenever it is desired to put a stone column into the lathe or remove it therefrom, the work-rests will be removed from the bed-plates 51 and dropped into the pit 50, thereby placing the said work-rests below the bed of the lathe and out of the way of the stone column, it being understood, of course, that before the work-rests are thus lowered into the pit 50 the roller-frame 21 will be adjusted to its lowest position by removing the sectional rests 36' and adjusting the adjusting-screws 35. After the stone has been placed in the lathe and centered, as above described, the work-rests will be raised from the pit and placed upon the bed-plates 51 either side of the pit, the housing of the work-rest being firmly secured to the bed-plates by any suitable means, as by bolts 60, and preferably either the bed-plate or the work-rest will have slots therein, so that the housing of the work-rest may be adjusted transversely of the lathe-bed. The surface of the stone column will be turned off to a true cylinder at the point immediately above the work-rests, and then the said roller-frames of each work-rest will be vertically adjusted to bring the outside rolls 25 in contact with the surface of the stone column. A sufficient number of sections 36' of the rest 36 will be used underneath each adjusting-screw 35 to bring the said roller-frame to the desired height. The central roll 36 is then vertically adjusted, by means of the adjusting-screw 38, so as to bring the said roll in contact with the stone. The adjusting-screws 35 may be then operated to raise the roller-frame sufficiently so that the said work-rest may support the proper proportion of the weight of the stone.

As the tool-carriage is operated to turn the surface of the stone to the desired diameter, the roller-frames 21 will of course be vertically adjusted, so as to keep the rolls in contact with the surface of the stone.

Generally stone columns are turned with the largest diameter in the center and with a taper toward each end, and it will be understood, of course, that the rolls in the roller-frame will be slightly conical, so as to fit the taper on the stone column. Where the column tapers and the rolls are conical, the weight of the stone upon the work-rests inclines to move the rests toward the smaller diameter of the stone, and I preferably, therefore, tie the two rests together by means of a tie-rod 70, so as to prevent them from separating, and to further steady the said rests I may use the brace-rod 71, which is screwed into a suitable boss in the roller-frame 21, as seen in Fig. 3, and is fastened at its lower end to any suitable anchor-plate in the foundation 5 for the lathe.

While the stone is being turned I may use rolls of any material; but while the stone is being polished I preferably use rolls having a surface of wood, as seen in Fig. 4, in order not to bruise or scratch the polished stone, the roller-frame 21 being provided with the removable caps 77, whereby when the same are removed the rolls become accessible and can be removed if it is desired to change the same.

The wooden rollers I prefer to use are made up by a series of wedge-shaped blocks 73, having the grain of the blocks running in a radial direction, the said blocks being supported on a suitable core 74, mounted upon the roller-shaft, and being sustained between flanges 75 (see dotted lines, Fig. 4) at the ends of the roll. Bolts 76 are passed through each block 73 and through the flanges 75 of the roll, thus tying the various parts of the rolls together. A roll constructed in this way is capable of sustaining a great weight without being crushed.

In lathes of a size to turn large stone pillars such as above described the immense weight of the tail-stock makes it difficult to move the same back and forth on the bed, so as to accommodate different lengths of columns, and to facilitate the movement of the tail-stock I provide the same with antifriction-rolls which are normally inoperative, but which may be rendered operative when it is desired to shift the position of the tail-stock.

Referring to Figs. 7 to 10, the tail-stock is provided with the shafts 92, running transversely of the lathe-bed and carrying friction-rollers 90, situated immediately above the ways 4 of the bed, the said shaft having the eccentric portion 91 mounted in suitable bearings in the tail-stock. The end of the shaft which projects beyond the bearings is preferably squared. The eccentricity of the portion 91 of the shaft is such that in one position of the shaft the rolls will be just out of contact with the ways 4 of the bed of the lathe, (see Fig. 9;) but by partially turning the said shaft the rolls are thrown down onto the bed and the tail-stock lifted sufficiently to clear the ways 4. The tail-stock then being supported on the antifriction-rolls 90 may be readily shifted to the desired position, when by turning the shaft backward again the said tail-stock will be lowered to rest upon the ways 4. The said tail-stock is then clamped in position by the hooked bolts 95, which engage the under side of the ways 4, as usual in this class of devices, the heads 150 of said hooks being held in place by the supporting-flange 151, which is integral with the tail-stock.

In the turning of stone columns of considerable length when the lathe is driven entirely from the head-stock the torsional strain on the column is so great as to injure the stone, and to prevent this I preferably provide means whereby the centers on both the head-stock and tail-stock are positively driven. For this purpose I preferably attach directly to the tail-stock, so as to be carried thereby and moved therewith, a motor or engine, which is connected by suitable gearing to the center or chuck in the tail-stock.

101 in Fig. 1 represents a ring having gear-teeth on its periphery, which ring is bolted or otherwise secured to the chuck or centering device 9 on the tail-stock, and 102 represents suitable brackets, which are secured in any suitable way, as by bolts, to one side of the tail-stock. A shaft 103, suitably journaled in said brackets, carries at one end a small pinion 104, which meshes with the gear-teeth on the ring 101, and at the other end a large gear 105, meshing with the pinion 106 on the crank-shaft of a suitable engine 107, supported on a bracket 108, bolted to the end of the tail-stock. The engine or motor may be of any suitable kind and is preferably of such a size as to furnish about half the power necessary to run the lathe. With this construction the power necessary to turn the stone columns is applied to both the head and tail stock in about equal proportions, and all tendency of the stone column to twist is obviated.

Preferably I will run the engine in such a direction that the shaft 103 will turn in the direction of the arrow $a$, Fig. 5, and the stone column in the direction of arrow $b$, so that the pinion 104 will exert a lifting action on the rim 101, thereby relieving the bearing 13 of some of the strain due to the weight of the stone column. The strain on the shaft 103 will therefore be such as to hold the brackets firmly onto the tail-stock, and the strain on the pinion 106 is such as to help hold the engine onto its bed. It will readily be seen that if the engine were rotated in the opposite direction there would be a tendency for the engine to lift itself from its bearings.

Various changes may be made in the construction of the device without departing from the spirit of the invention.

Having described my invention, what I claim, and desire to secure by Letters Patent, is—

1. A work-rest for stone-dressing lathes, said rest comprising a housing situated between the ways of the bed of the lathe, a roller-frame adjustably mounted in said housing, a plurality of rolls in said frame, and extensible compression members projecting from each side of the housing and adapted to engage the ways of the lathe-bed.

2. A work-rest for stone-turning lathes, comprising a housing adapted to be placed between the ways of the lathe-bed, a roller-frame vertically adjustable in said housing, said roller-frame having three parallel rolls journaled therein and projecting above the upper side thereof, the central roll being vertically adjustable in the roller-frame.

3. A work-rest for stone-turning lathes, comprising a housing adapted to be placed between the ways of the lathe-bed, a roller-frame carried by said housing and having a series of rolls, means for vertically adjusting said roller-frame in the housing, said adjusting means comprising a series of adjusting-screws operating in the floor of the roller-frame and bearing at their lower ends in detachable rests carried by the housing.

4. A work-rest for stone-turning lathes, comprising a housing adapted to be placed between the ways of the lathe-bed, a frame carried by said housing and having a bearing to partially support the stone, means for vertically adjusting said frame in the housing, said adjusting means comprising a series of adjusting-screws operating in the floor of the frame and bearing at their lower ends on elastic rests carried by the housing.

5. A work-rest for stone-turning lathes, comprising a housing adapted to be placed between the ways of the lathe-bed, a roller-frame carried by said housing and having three parallel rolls journaled therein, means for adjusting the central roll relative to the outside rolls, and means for vertically adjusting said roller-frame in the housing, said adjusting means comprising a series of adjusting-screws operating in the said roller-frame and bearing at their lower ends on rests carried by the housing.

6. A work-rest for stone-turning lathes, comprising a housing situated between the ways of the lathe-bed, a roller-frame carried by said housing, and having a series of rolls journaled therein, means for vertically adjusting said roller-frame in the housing, said adjusting means comprising a series of adjusting-screws operating in the said frame, and bearing at their lower ends in rests, said rests being made in sections, whereby the height of the rest may be varied.

7. In a stone-turning lathe, a bed, head and tail stocks each having a rotary centering device to support the end of a stone column, driving means on the head-stock to rotate the centering device thereon, and a motor connected to the centering device on the tail-stock and operating to drive the same, said motor being independent from the driving means on the head-stock.

8. In a stone-turning lathe, a bed, head and tail stocks each having a rotary centering device to support the end of a stone column, driving means on the head-stock to rotate the centering device thereon, and a motor connected to the centering device on the tail-stock and operating to drive the same, said motor being independent from the driving means on the head-stock and capable of developing approximately half the power needed to operate the lathe.

9. In a stone-turning lathe, a bed, head and tail stocks each having a rotary centering device to support the end of a stone column, driving means connected with the centering device on the head-stock and operating to rotate the same, and a motor supported on the tail-stock and operatively connected with the centering device thereon, said motor being independent from the driving means for the head-stock.

10. In a stone-turning lathe, a bed, head and tail stocks, each having a rotary centering device to support the end of a stone column, driving means connected with the centering device on the head-stock and operating to rotate the same, and a motor carried by and movable with the tail-stock and operatively connected to the centering device on the latter, said motor operating independently from the driving devices on the head-stock and being capable of developing half the power necessary to operate the latter.

In testimony whereof I have signed my name to this specification in the presence of two subscribing witnesses.

ETHAN R. CHENEY.

Witnesses:
LOUIS C. SMITH,
GEO. W. GREGORY.